United States Patent

Hodapp et al.

[11] Patent Number: 5,915,668
[45] Date of Patent: Jun. 29, 1999

[54] FAIL SAFE VALVE ACTUATOR

[75] Inventors: Gary Dennis Hodapp; Semor David Tofte, both of Mankato, Minn.

[73] Assignee: Micro-Trak Systems, Inc., Eagle Lake, Minn.

[21] Appl. No.: 09/036,138

[22] Filed: Mar. 6, 1998

[51] Int. Cl.[6] .................................................. F16K 31/04
[52] U.S. Cl. ............................. 251/129.13; 251/129.12; 251/69; 74/2; 310/78
[58] Field of Search ........................ 251/129.13, 129.12, 251/129.11, 69; 74/2; 310/75 R, 76, 77, 78

[56] References Cited

U.S. PATENT DOCUMENTS

| | | |
|---|---|---|
| 1,559,018 | 10/1925 | Taylor . |
| 2,236,145 | 3/1941 | Kolb . |
| 3,082,627 | 3/1963 | Yeo et al. . |
| 3,259,357 | 7/1966 | Sharp . |
| 3,430,916 | 3/1969 | Raymond, Jr. .................. 251/129.12 X |
| 3,705,594 | 12/1972 | Placek .................................... 251/69 X |
| 3,808,895 | 5/1974 | Fitzwater . |
| 3,874,630 | 4/1975 | Novey . |
| 4,113,063 | 9/1978 | Troy . |
| 4,289,038 | 9/1981 | Hote . |
| 4,771,643 | 9/1988 | Mott . |
| 5,195,721 | 3/1993 | Akkerman .......................... 251/129.13 |
| 5,205,534 | 4/1993 | Giordani ............................ 251/129.11 |

*Primary Examiner*—Kevin Lee
*Attorney, Agent, or Firm*—Merchant, Gould, Smith, Edell, Welter & Schmidt, P.A.

[57] ABSTRACT

A valve actuating apparatus is provided for operating a valve between an open and closed position. The valve actuating apparatus includes an actuator having an output member with the actuator providing reciprocating motion to the output member upon energization of the actuator. A guide member having a detent therein is connected to the output member of the actuator. The apparatus includes a clutch assembly having a housing, an electromagnet assembly, an engagement member, and a housing opening with the engagement member disposed in the housing between the electromagnet assembly, and the housing opening. The housing opening is adapted to receive the guide member therein such that the clutch assembly and a portion of the guide member are slidably connected. The electromagnet assembly is selectively energized to force the engagement member against the guide member disposed in the housing opening. A valve control arm is adapted for engagement with the valve to operate the valve between the open and closed positions and is connected to the clutch assembly. A spring is connected to the valve control arm or the clutch assembly for normally biasing the clutch assembly to a first position along the guide member such that the valve control arm is in the closed position. Upon interruption of power to the electromagnet assembly, the spring forces the engagement member of the clutch assembly out of engagement with the detent in the guide member and the spring forces the clutch assembly to slide back along the guide member to the first position and rotates the valve control arm to the closed position.

16 Claims, 8 Drawing Sheets

FAIL SAFE VALVE ACTUATOR

BACKGROUND OF THE INVENTION

1. Field of the Invention

This invention relates generally to the field of valve actuation mechanisms and more particularly to a fail safe valve actuating apparatus.

2. Description of the Art

In the field of valve actuators, it is known to provide a fail safe mechanism for actuating a valve, typically from the open to the closed position, when electrical power is intentionally or accidentally interrupted to the valve actuator. Such valve actuators typically utilize some type of a solenoid to operate the valve between the open and closed positions. An example of an application for the use of a fail safe valve actuator is in the agricultural field such as in the application of anhydrous ammonia ($NH_3$) or other materials. For example, in the agricultural application of anhydrous ammonia, typically a tractor is pulling an implement for applying the anhydrous ammonia from a storage tank contained on the implement or on a trailer towed by the implement. Typically, the valve actuator is used to open and close the valve remotely from the cab of the tractor. Accordingly, it is desired to have a fail safe actuator mechanism such that upon accidental or intentional interruption of power to the actuator, the actuator will shut off the valve to prevent the escape of anhydrous ammonia. For example, if the tractor was unintentionally separated from the implement carrying the anhydrous ammonia, it is desired to have the actuator mechanism shut off the valve to prevent escape of anhydrous ammonia.

Various valve actuator mechanisms are known in the art. For example, U.S. Pat. No. 4,289,038 and U.S. Pat. No. 4,113,063 both disclose actuator mechanisms which provide a fail safe mechanism under emergency or other conditions. Such mechanisms involve a complex mechanism with numerous moving parts and are not designed for use in a harsh environment such as described above.

What is needed is a fail safe valve actuator which is capable of controlling a valve from a remote location while also providing a fail safe mechanism for shutting off the valve when power is interrupted, either accidentally or intentionally, to the actuation mechanism. Further, a valve actuation mechanism is needed which provides for simple, dependable operation while operating in a harsh environment such as in conjunction with the application of materials in an agricultural setting.

SUMMARY OF THE INVENTION

The present invention provides a fail safe valve actuating apparatus which provides for dependable actuation of a valve between open and closed positions while including a fail safe mechanism for shutting off the valve in the event power is interrupted to the valve actuating apparatus.

According to one aspect of the present invention, a fail safe valve actuating apparatus is provided for operating a valve between an open and closed position which includes an actuator to provide reciprocating motion to a guide member upon energization of the actuator. The guide member is connected to the actuator and has a detent therein. The apparatus further includes a clutch assembly having a housing, an electromagnet assembly, an engagement member, and a housing opening. The engagement member is disposed in the housing between the electromagnet assembly and the housing opening. The housing opening is adapted to receive the guide member therein such that the clutch assembly and a portion of the guide member are slidably connected. The electromagnet assembly is selectively energized to force the engagement member against the guide member disposed in the clutch assembly. The apparatus further includes a valve control arm adapted for engagement with the valve to operate the valve between the open and closed positions. The valve control arm is connected to the clutch assembly. A spring is connected to the valve control arm or the clutch assembly for normally biasing the clutch assembly to a first position along the guide member such that the valve control arm is in the closed position. A switch is provided for selectively permitting the energization of the actuator. The switch is normally in a closed position to permit energization of the actuator with the switch disposed adjacent the valve control arm.

Upon energization of the actuator and the electromagnet assembly, the actuator moves the guide member to position the detent of the guide member adjacent the engagement member of the clutch assembly. The electromagnet assembly forces the engagement member into engagement with the detent of the guide member to couple the guide member and clutch assembly together. At this point, further reciprocal movement of the guide member rotates the valve control arm connected to the clutch assembly to the open position where the valve control arm engages the switch to interrupt power to the actuator to maintain the valve control arm in the open position. Upon interruption of power to the electromagnet assembly, the biasing force of the spring forces the engagement member of the clutch assembly to disengage from the detent of the guide member to uncouple the guide member and clutch assembly and the spring forces the clutch assembly to slide back along the guide member to the first position to rotate the valve control arm to the closed position to close the valve.

In accordance with another embodiment of the present invention, there is provided a fail safe valve actuating apparatus which includes a motor to provide rotary power to an output shaft. A guide member is connected to the output shaft of the motor and includes an aperture therein. The apparatus further includes a ball clutch assembly having a housing, an electromagnet assembly, a ball, and a housing opening. The ball is disposed in the housing between the electromagnet assembly and the housing opening and the housing opening is adapted to receive the guide member therein such that the ball clutch assembly and a portion of the guide member are slidably connected. The electromagnet assembly is selectively energized to force the ball against the guide member disposed in the housing opening. The apparatus further includes a valve control arm adapted for engagement with a valve to operate the valve between an open and closed position with the valve control arm connected to the ball clutch assembly. A spring is connected to the valve control arm or the ball clutch assembly, normally biasing the ball clutch assembly to a first position along the guide member such that the valve control arm is in the closed position. A switch is provided for selectively permitting energization of the motor with the switch normally in the closed position to permit energization of the motor.

Upon energization of the motor and electromagnet assembly, the motor output shaft rotates to position the aperture of the guide member adjacent the ball of the ball clutch assembly. The electromagnet assembly forces the ball into engagement with the aperture of the guide member to couple the guide member and ball clutch assembly together wherein further rotation of the motor output shaft moves the guide member and ball clutch assembly to rotate the valve control arm to the open position. At this point, the valve control arm engages the switch to interrupt power to the motor to maintain the valve control arm in the open position. Upon interruption of power to the electromagnet assembly, the biasing force of the spring forces the ball of the ball clutch assembly to disengage from the aperture of the guide member to uncouple the guide member and ball clutch assembly and the spring forces the ball clutch assembly to slide back along the guide member to the first position to rotate the valve control arm to the closed position to close the valve. In one embodiment, the electromagnet assembly is in the form of a solenoid.

In accordance with further aspects of the present invention, the valve actuating apparatus may include a brake such that when the valve control arm activates the switch to shut off power to the motor, the brake stops the rotation of the output shaft of the motor. Preferably, the brake constitutes an electrical brake which creates a short across the motor to create a braking effect on the motor.

According to another aspect of the present invention, the apparatus preferably includes a mechanical switch such that valve control arm contacts the switch to activate the switch to interrupt power to the motor.

The above-described features and advantages, along with various other advantages and features of novelty, are pointed with particularity in the claims of the present application which a part hereof. However, for a better understanding of the invention, its advantages, and objects obtained by its use, reference should be made to the drawings which form a further part of the present application and to the accompanying descriptive matter in which there is illustrated and described the preferred embodiments of the invention.

DETAILED DESCRIPTION OF THE INVENTION

Figure 1:
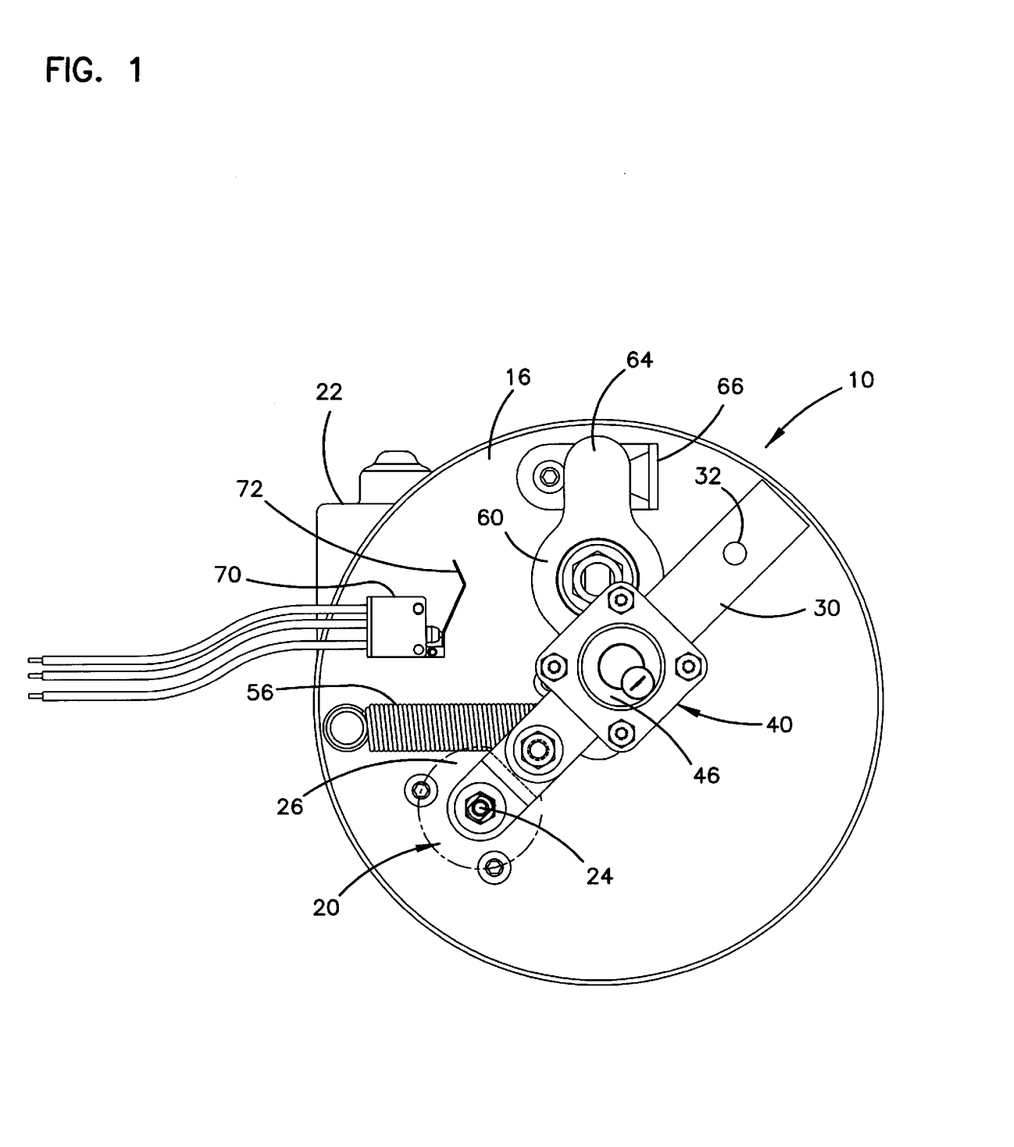
FIG. 1 is a top plan view of a fail safe valve actuating apparatus according to the principles of the present invention with the valve shown in the closed position.
Figure 2:
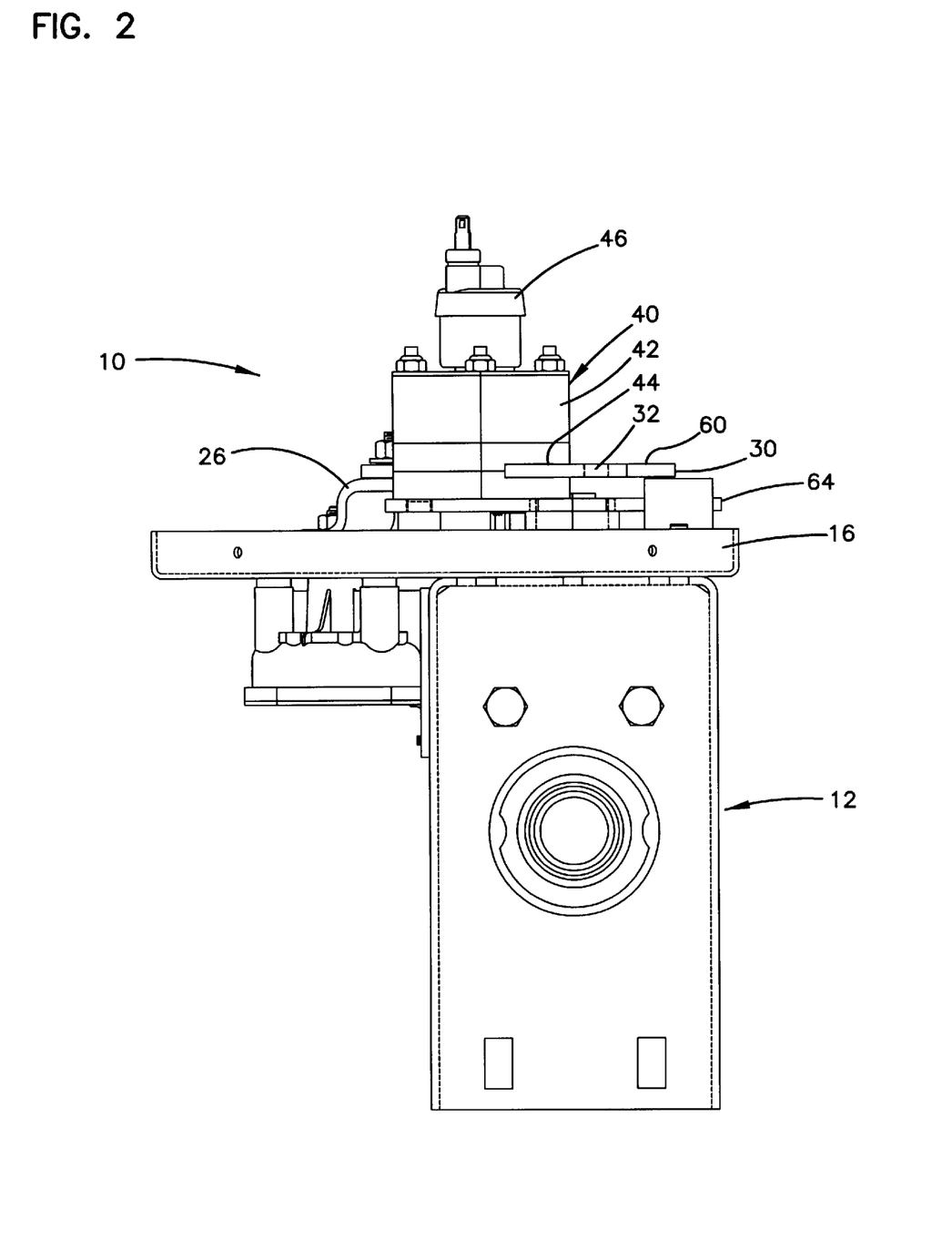
FIG. 2 is a side view of the apparatus shown in FIG. 1.

Referring now to the drawings in which similar elements are numbered identically throughout, a description of the preferred embodiments is provided. In FIG. 1, a top view of a fail safe valve actuating apparatus according to the principles of the present invention is generally illustrated at 10. The valve actuating apparatus 10 preferably includes a base 16 upon which the various components of the apparatus are mounted. The apparatus includes an actuator 20 providing a reciprocating motion to a guide member 30. In a preferred embodiment, the actuator constitutes a motor 22 having an output shaft 24. The motor 22 is connected to the guide member 30 through an arm 26. In one embodiment, the motor is a 12-volt DC gear motor having 360° rotation of the output shaft. The guide member 30 is connected at one end to the actuator 20 and includes a detent 32 located along the guide strap at a position away from the end connected to the actuator 20. In one embodiment, the detent is formed as an aperture 34 in the guide member. The guide member is preferably formed of a solid material such as steel.

Referring to FIGS. 1–4, the valve actuator apparatus further includes a clutch assembly 40 having a housing 42 with a housing opening 44 for receiving the guide member 30 therein. In one embodiment, the housing opening is formed as a slot 44 and receives the guide member so that the guide member 30 is slidable within the housing 42 of the clutch assembly 40. The clutch assembly further includes an electromagnet assembly which may take a variety of forms. In one embodiment, the clutch assembly 40 includes an electromagnet assembly in the form of a solenoid 46 having a shaft or piston 48 with the solenoid connected to the housing 42. An engagement member is disposed in a cavity 54 in the housing 42 between the housing opening 44 and the solenoid 46. In one embodiment, the engagement member is in the form of a ball 52 which is disposed between the solenoid piston 48 and the housing opening 44. With the guide member 30 disposed in the housing opening 44 of the clutch assembly 40, the ball 52 rests against the guide member 30 and the piston shaft 48 of the solenoid 46. In one embodiment, the solenoid is a 12-volt DC solenoid. It is appreciated that other solenoids or other electromagnet assemblies may be used in accordance with the principles of the present invention.

Referring to FIGS. 1–6, the base 16 of the valve actuating apparatus 10 is preferably mounted adjacent the valve 12 such that the valve stem 14 extends through the base 16 of the apparatus 10. The valve stem 14 is connected to a valve control arm 60. The valve control arm 60 is connected between the clutch assembly 40 and the valve stem 14 of the valve 12. The valve control arm is securely connected to the valve stem 14 such that rotation of the valve control arm 60 rotates the valve stem 14. In one embodiment, a 90° rotation of the valve control arm serves to rotate the valve stem between open and closed positions. It is appreciated that other variations in rotation may be utilized in conjunction with the principles of the present invention. For example, the invention could be utilized to rotate a valve control arm between 180° to operate a valve between an open and closed position. The valve control arm 60 includes an extension member 64. In one embodiment, the extension member 64 extends opposite the end of the valve control arm attached to the clutch assembly 40.

Referring to FIG. 1, the valve actuating apparatus 10 includes a spring 56 which is connected between the base 16 of the apparatus 10 and the valve control arm 60. The spring 56 biases the valve control arm 60 and the clutch assembly 40 along the guide member 30 to a position away from the aperture 34 in the guide member 30. In a preferred embodiment, a coiled spring 56 is utilized with the apparatus. It is appreciated that other forms of springs may be utilized to provide a biasing force with respect to the clutch assembly 40. It is further noted that the spring 56 may be connected to either the valve control arm 60 or the clutch assembly 40.

The valve actuating apparatus 10 further includes a switch 70 which is mounted to the base 16 of the valve actuating apparatus 10. The switch 70 is positioned such that upon rotation of the valve control arm 60 from the closed to the open position, the extension member 64 of the valve control arm 60 engages the switch 70. The switch 70 is electrically connected to the motor 22 such that when the valve control arm is not in engagement with the switch, the switch is normally closed to allow current flow from a power source to the motor 22. When the valve control arm 60 rotates to the open position, the extension member 64 engages the switch 70 to open the switch to stop current flow to the motor 22.

In a preferred embodiment, the apparatus 10 may include a cover or shroud 80 which is connected with the base 16 of the apparatus to enclose the apparatus. The cover 80 is helpful in preventing foreign materials such as dirt, water, etc. from collecting on the components of the valve actuating apparatus which could hinder operation of the device.

The sequence of operation for the valve actuating apparatus will now be described with respect to a particular illustrated application. In the illustration, the valve actuating apparatus 10 is electrically connected to a 12-volt DC power source (see FIG. 7) and the electromagnet assembly is in the form of a solenoid 46. Both the solenoid 46 and the motor 22 are connected to the power source with the motor 22 further connected to the switch 70. The power source may be located at a location remote from the valve actuating apparatus, such as on a tractor which is pulling an agricultural implement to supply anhydrous ammonia to the valve 12 for application.

Figure 3:
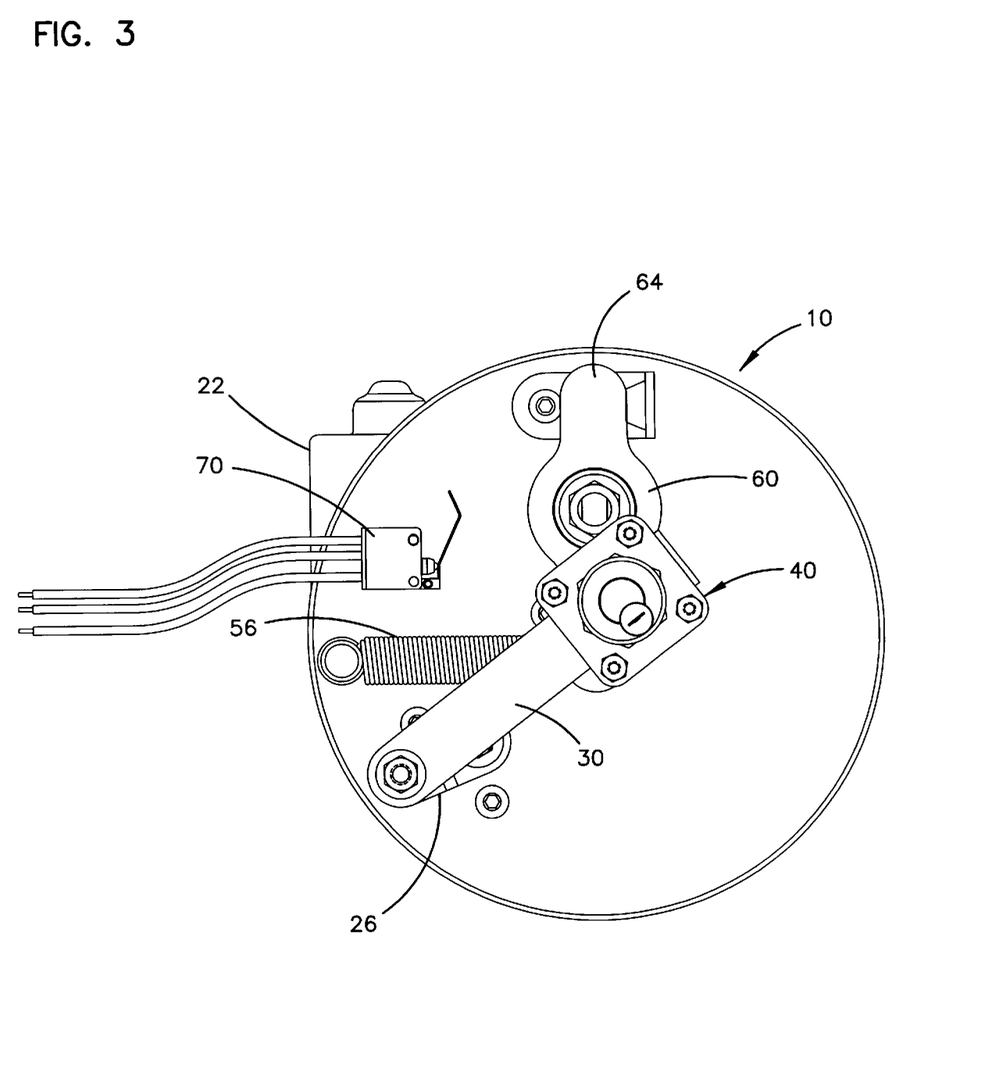
FIG. 3 is a top plan view of the apparatus shown in FIG. 1 with the apparatus shown in the actuating engagement point.
Figure 4:
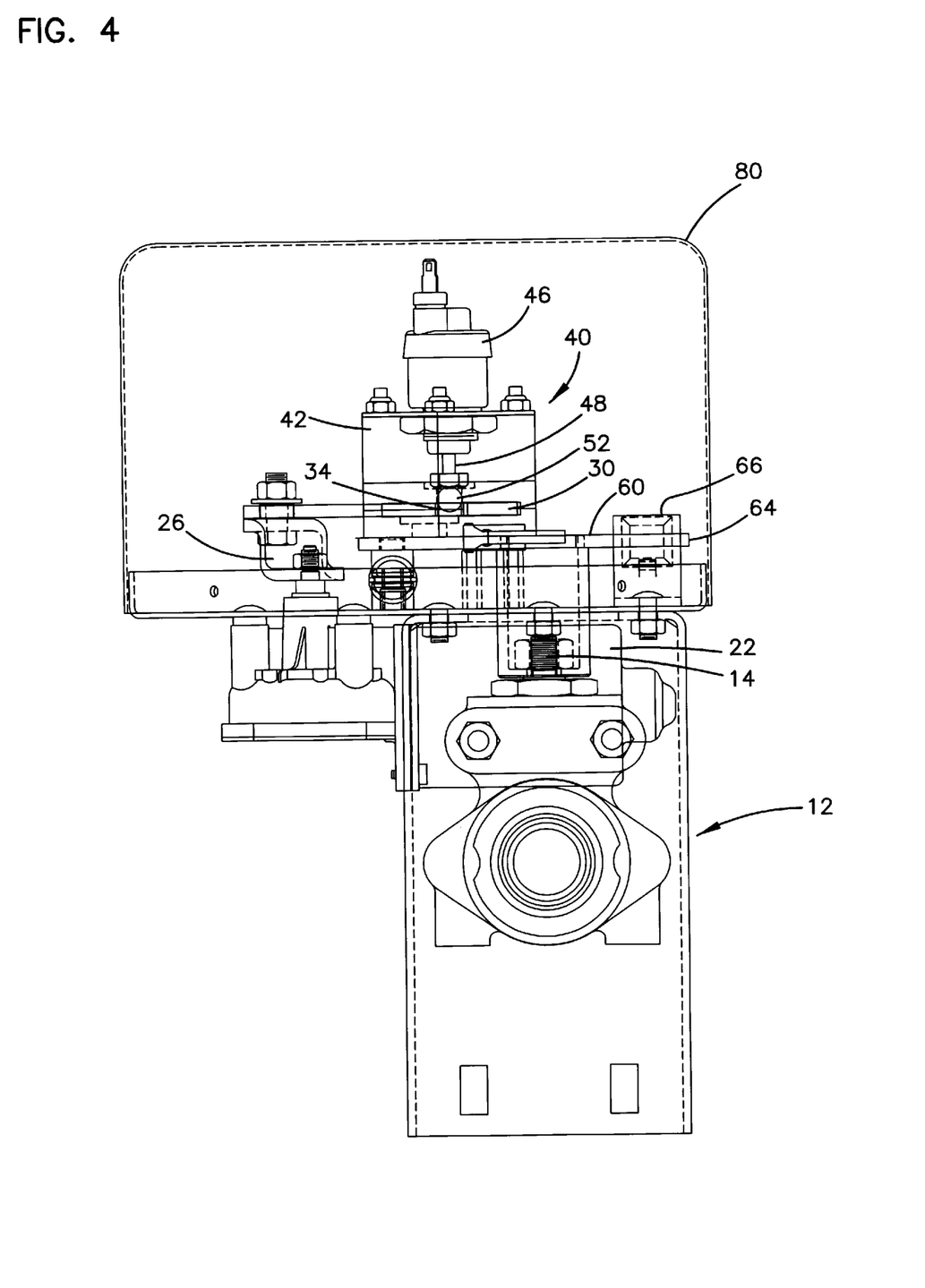
FIG. 4 is a side sectional view of the apparatus shown in FIG. 3.

As a starting point, the valve actuating apparatus 10 is in the closed position shown in FIG. 1. In this position, the spring 56 biases the clutch assembly 40 along the guide member 30 such that the valve control arm 60 is in the closed position so that the valve is closed. In this position, the extension member 64 of the control arm 60 rests against a stop 66 which is secured to the base 16 of the valve actuating apparatus 10. In this position, the switch 70 is in the closed position so that current may be supplied to the motor from the power source. To actuate the valve to the open position, the power source is switched on to energize the valve actuating apparatus 10. As the power source is turned on, current is supplied to both the solenoid 46 and the motor 22 as the switch 70 is in the normally closed position (see FIG. 7). At this point, the piston 48 of the solenoid 46 forces the ball 52 against the guide member 30 which is disposed in the clutch assembly 40. Upon energization of the motor, the output shaft rotates and correspondingly moves the guide member 30 connected to connecting arm 26. The rotation of the motor output shaft 24 slides the guide member 30 through the housing opening 44 of the clutch assembly 40 to the ball engagement point, as shown in FIG. 3. At this position, the aperture 34 in the guide member 30 is disposed adjacent the ball 52 in the clutch assembly 40. At this point, the piston 48 of the solenoid 46 forces the ball 52 into the aperture 34 of the guide member 30 to securely connect the clutch assembly 40 to the guide member 30. With the clutch assembly 40 securely connected to the guide member 30, further rotation of the output shaft 24 of the motor 22 causes the movement of the clutch assembly 40 against the biasing force of the springs 56 to the position shown in FIG. 5. The movement of the clutch assembly 40 coupled to the guide member 30 causes the rotation of the valve control arm 60 which is pivotably connected to the valve stem 14 of the valve 12. In this embodiment, the movement of the clutch assembly 40 rotates the valve control arm 90° to rotate the valve stem from the closed position to the open position.

Figure 5:
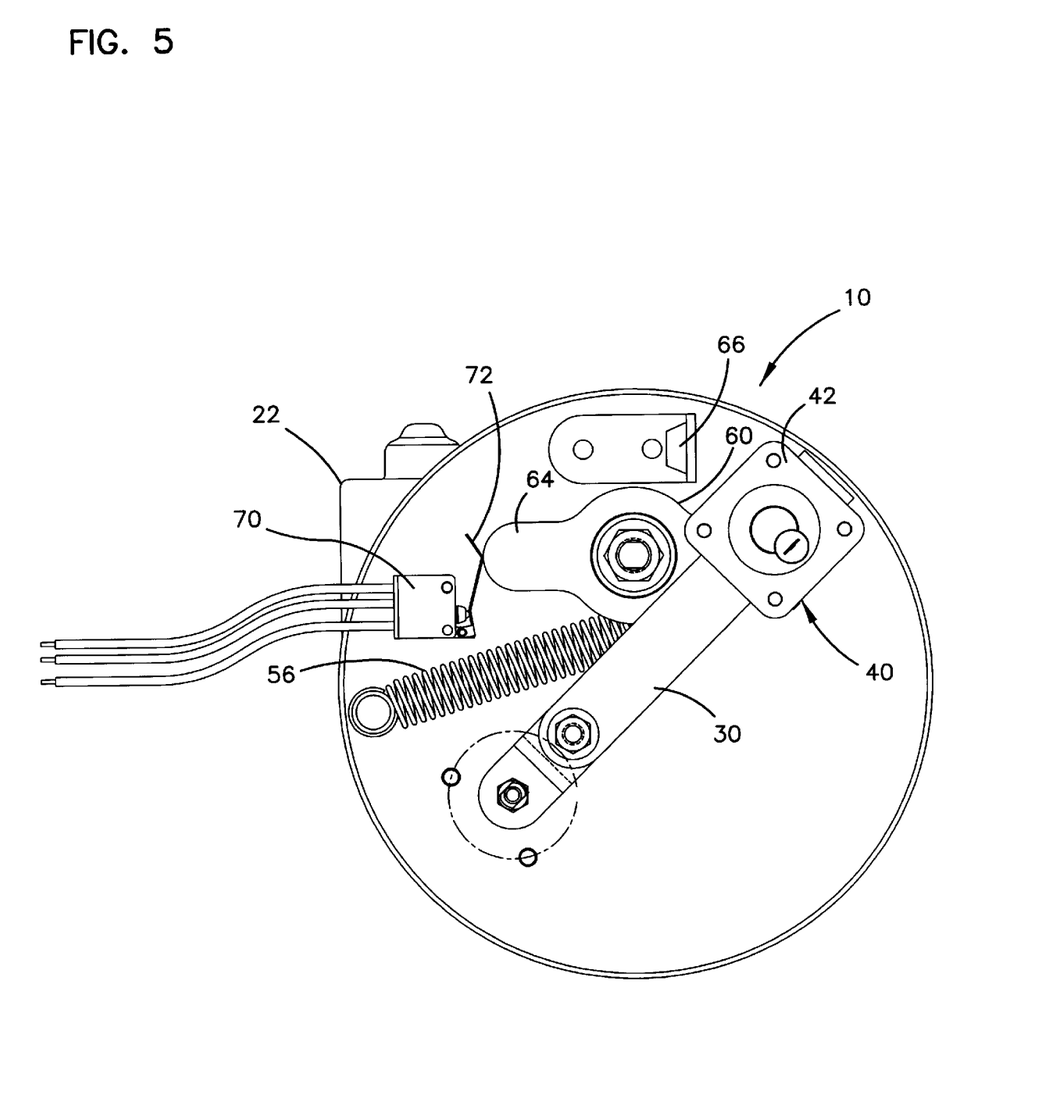
FIG. 5 is a top plan view of the apparatus shown in FIG. 1 with the valve shown in the open position.
Figure 6:
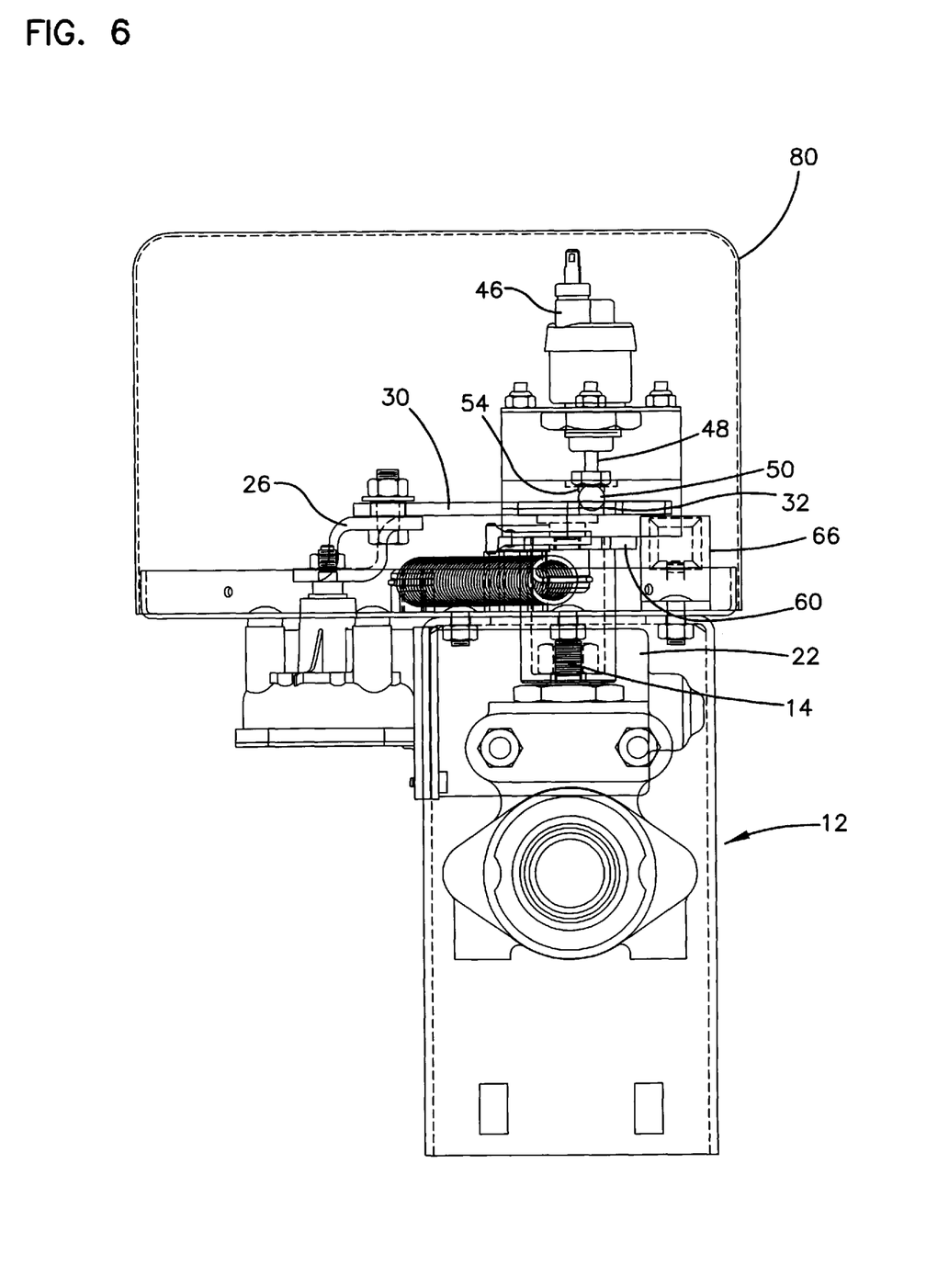
FIG. 6 is a side sectional view of the apparatus shown in FIG. 5.

As the rotation of the valve control arm 60 approaches 90°, the extension member 64 of the valve control arm 60 engages the switch 70, as shown in FIG. 5. In one embodiment, the switch 70 includes a contact arm 72 which engages the extension member 64 of the valve control arm 70 as the valve control arm is rotated from the closed to the open position. As the extension member 64 of the valve control arm 60 depresses the contact arm 72, the switch 70 opens the circuit between the power source and the motor 20 to stop the current flow to the motor 22. This causes the output shaft 24 of the motor 22 to stop at this position with the valve in the open position (see FIG. 5). As the switch 70 is activated to stop current flow to the motor 22, the power source is still supplying energy to the solenoid 46 so that the ball 52 is retained in the aperture 34 of the guide member 30 to maintain the valve control arm 60 in the open position.

When the valve is in the open position as shown in FIG. 3, the loss of current to the valve actuating apparatus 10, either intentionally or accidentally, activates the fail safe mechanism of the apparatus to return to the valve to the closed position. First, the cutting of current to the valve actuating apparatus 10 deactivates the solenoid which releases the pressure being applied to the ball 52 disposed in the aperture 34 of the guide member 30. The biasing force of the spring 56 on the clutch assembly 40 forces the ball 52 out of engagement with the aperture 34 in the guide member 30. The spring 56 then slides the clutch assembly housing 42 along the guide member 30, which rotates the valve control arm back to the closed position (see FIG. 1). As the spring 56 slides the clutch assembly 40 along the guide member 30, the extension member 64 of the valve control arm 60 contacts a stop 66 when the valve control arm has rotated the valve stem back to the closed position. In this way, the cutting of the current to the valve actuating apparatus 10 results in the rotation of the valve from the open to the closed position.

Accordingly, in actual operation, the operator may use a remote switch to shut off the power source from the valve actuating apparatus 10 wherein the valve actuating apparatus 10 rotates the valve from the open to the closed position. Additionally, if the current is accidentally cut to the valve actuating apparatus, for example, if the agricultural implement being towed by the tractor is somehow separated from the tractor, the cutting of the current from the power source to the valve actuating apparatus results in the valve actuating apparatus 10 rotating the valve from the open to the closed position. Accordingly, the fail safe mechanism provides increased safety by shutting the valve in the event the current is accidentally cut to the valve actuating apparatus. In the example described above, the valve controlling the flow of anhydrous ammonia would be shut off, preventing leakage of anhydrous ammonia in the event of an accident which could pose a significant safety hazard. Additionally, the valve actuating apparatus allows for remote operation of the valve between the open and closed position, such as from the cab of the tractor, by intentionally turning on or shutting off the power source to the valve actuating apparatus.

Figure 7:
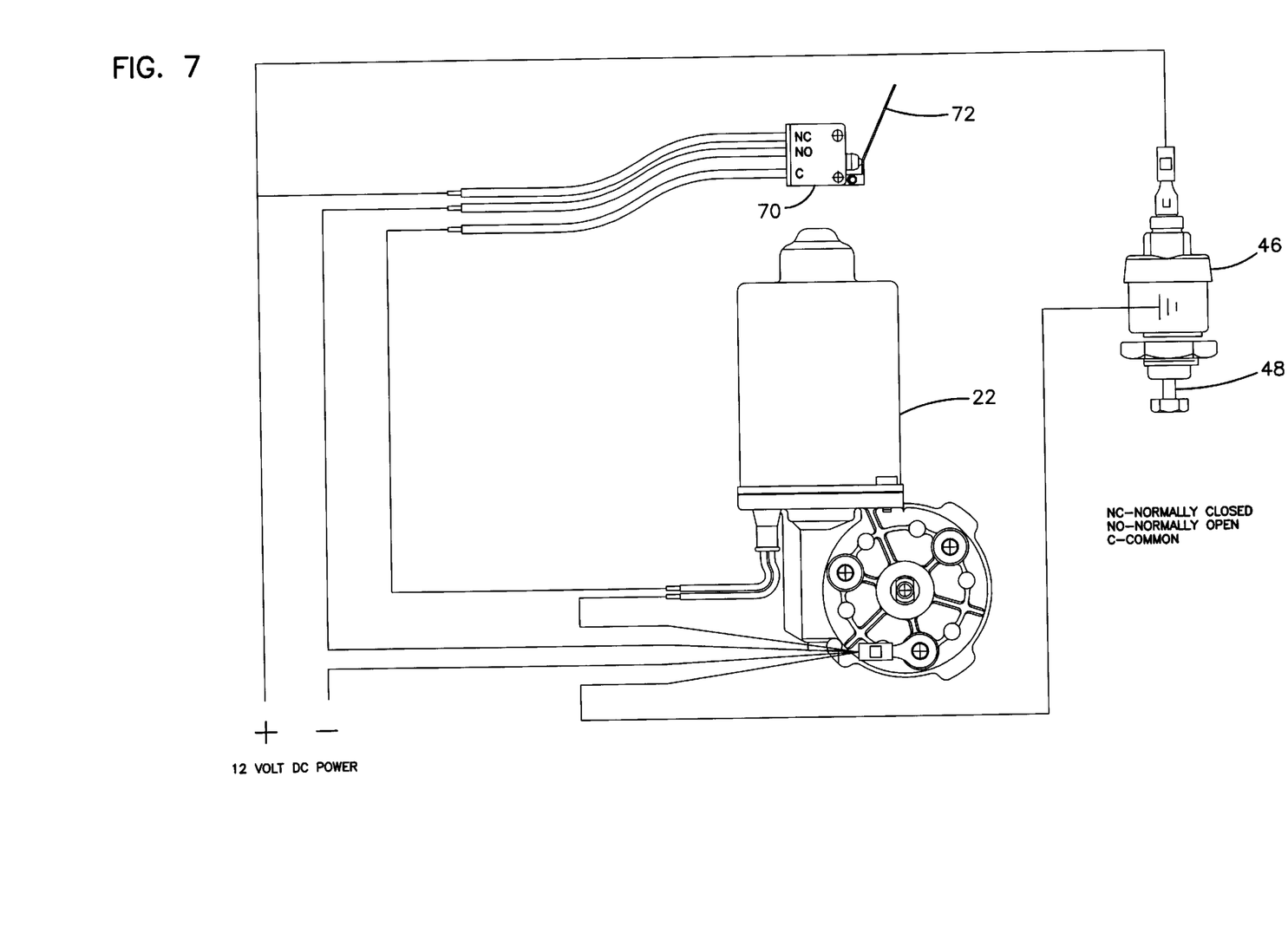
FIG. 7 is a wiring diagram for the apparatus shown in FIG. 1.

Pursuant to another aspect of the present invention, the valve actuating apparatus 10 may include a braking feature so that when the valve control arm 60 engages the switch 70 to cut off power to the motor 22, the braking feature stops rotation of the motor almost instantaneously. Referring to FIG. 7, the switch 70 includes a circuit which is normally open, which is connected to the motor 22. The switch also includes a common wire which is connected to the motor opposite the normally open circuit. In operation, when the switch arm 72 is depressed by the extension member 64 of the valve control arm 60, the circuit between the normally closed and common positions of the switch is open, which stops current flow to the motor. At the same time, the circuit is closed between the normally open and common positions of the switch 70. This causes a short across the motor, which causes a braking action to occur on the motor, stopping its rotation suddenly. In this way, the motor 22 stops its rotation with the valve control arm 60 in the open position.

It is appreciated that the braking feature is helpful in ensuring dependable operation of the valve actuating mechanism. Without a braking feature, even though the current is shut off to the motor, rotational momentum may cause the valve control arm to overtravel its position, leaving the valve in an undesired position or causing the valve control arm to rotate away from the switch, causing the motor to be turned on again. The electrical braking feature described above helps eliminate these potentially undesirable effects by immediately stopping the rotation of the motor in the desired open position. It is appreciated that other types of braking mechanisms may be utilized. For example, a mechanical braking mechanism could be utilized in conjunction with the cutting off of current to the motor to stop the rotation of the motor.

With respect to the clutch assembly, it is appreciated that various structures may be utilized in addition to the ball-aperture structure disclosed for coupling the guide member 30 to the clutch assembly 40. For example, the detent 32 may be formed as a ball socket rather than an aperture. Additionally, the engagement member 60 may be formed other than as a ball 52. For example, the engagement member may be formed as cylindrical bar with the corresponding detent 32 in the guide member 30 formed as a grooved slot so that the bar engages the slot to couple the guide member 30 to the clutch assembly 40. Accordingly, other similar engagement structures may be utilized according to the principles of the present invention to couple the guide member and clutch assembly together.

It is noted that while a preferred embodiment discloses a mechanical switch having a contact arm which engages the valve control arm, other types of switches may be used in accordance with the principles of the present invention. For example, a magnetic switch may be utilized in which the extension member 64 is composed of a metal material. When the valve control arm rotates from the closed to the open position, the extension member 64 passes over the magnetic switch to activate the switch and cut off the current flow to the motor to stop the valve control arm in the open position.

It is further appreciated that while the one embodiment of the invention discloses an actuator 20 in the form of a DC gear motor which provides rotary power to an output shaft, other forms of actuators may be utilized in conjunction with the present invention. For example, a linear actuator may be utilized, such as a reciprocating piston or cylinder to provide reciprocal movement of the guide member to position the detent 32 of the guide member adjacent the engagement member 50 of the clutch assembly 40 for coupling the guide member 30 to the clutch assembly 40 and providing subsequent reciprocal movement of the guide member to rotate the valve control arm from the closed to the open position. It is further appreciated that the spring 56 may take various forms other than the coiled spring disclosed in a preferred embodiment. For example, a gas spring could be utilized to provide the biasing force on the clutch assembly 40 to bias the valve control arm 60 to the closed position. Other similar types of springs may be utilized in accordance with the principles of the present invention.

Figure 8:
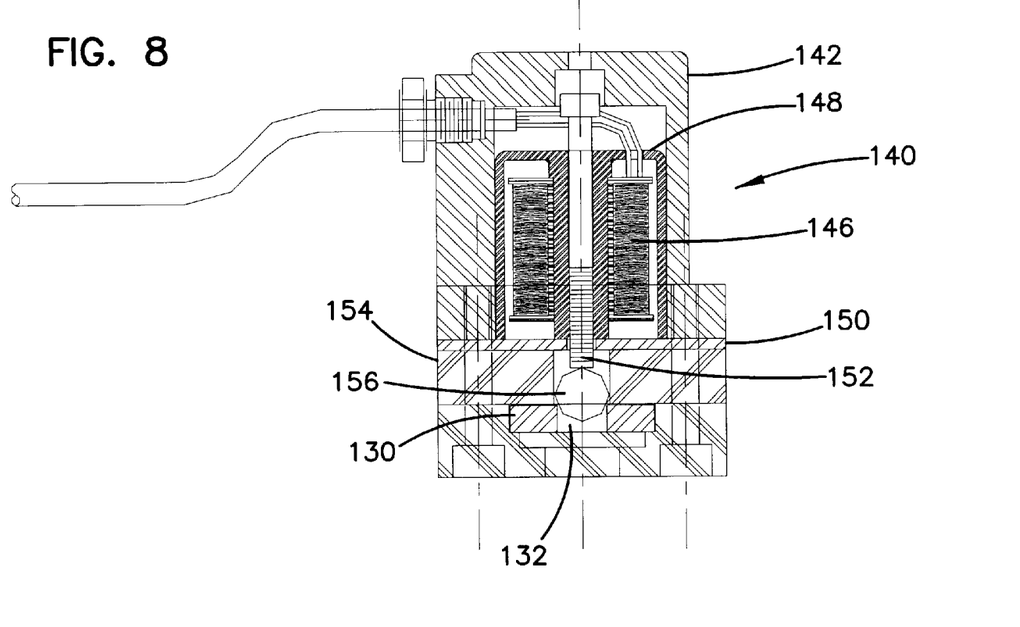
FIG. 8 is a side sectional view of an alternative electromagnet assembly shown in the engaged position according to the principles of the present invention.
Figure 9:
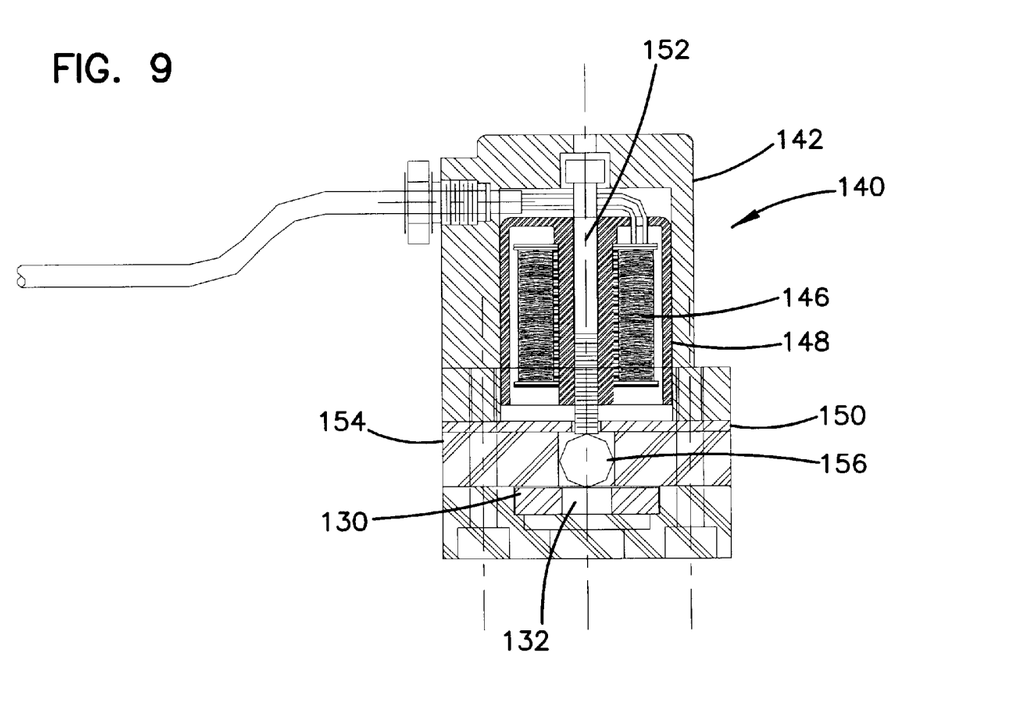
FIG. 9 is a side sectional view of the apparatus shown in FIG. 8 shown in the disengaged position.

Referring to FIGS. 8–9, an alternative embodiment of an electromagnet assembly is provided. In this embodiment, the clutch assembly 140 includes a housing 142 which contains an electromagnet 146 and a magnet core 148. A fixed magnet plate 150 is provided adjacent the magnet core 148 and a ball 156 is disposed in an opening adjacent the guide member 130. An adjustable screw or shaft 152 is securely connected to the magnet core 148 and extends downward to engage the ball 156.

When no electric current is provided to the electromagnet 146, the magnet core 148 can move vertically within the housing 142. This allows the ball 156 to disengage the aperture 132 in the guide member 130 which allows the guide member 130 to slide with respect to the clutch assembly 140. (See FIG. 9). When an electric current is supplied to the electromagnet, this causes the magnet core 148 (movable) to attract the metal magnet plate 150 (fixed) thus pulling the magnet core downward in the housing 142. This motion cannot occur, however, until the aperture 132 in guide member 130 is aligned with the ball 156 contained in the spacer portion 154 of the clutch assembly 140. Once the alignment occurs, the adjusting screw 152 is forced down with the magnet core 148 toward the magnet plate 150 and forces the ball 156 into the aperture 132 of the guide member 130 to couple the clutch assembly and guide member together. Once the ball 152 is engaged in the aperture 132, the clutch assembly 140 which is attached to the valve control arm then begins to move with the guide member 130 thus rotating the valve to the appropriate position.

With the screw 152 adjusted properly, the magnet core 148 will preferably make full contact with the magnet plate 150 which forces full contact of the ball 150 in the aperture 132 of the guide member 130. The adjusting screw 152 allows for adjustment of the vertical position of the ball 156 and magnet core 148. Thus the adjusting screw 152 can be used to overcome any possible manufacturing tolerance variations and provide for optimum positioning of the ball 156 for engagement within the aperture 132 of the guide member 130.

It is to be understood that even though numerous characteristics and advantages of various embodiments of the present invention have been set forth in the foregoing description, together with the details of the structure and functions of various embodiments of the invention, this disclosure is illustrative only and changes may be made in details, especially in matters of shape, size, and arrangement of parts, within the principles of the present invention, the full extent indicated by the broad general meaning of the terms in which the appended claims are addressed.

Other modifications of the invention will be apparent to those skilled in the art in view of the foregoing descriptions. These descriptions are intended to provide specific examples of embodiments which clearly disclose the present invention. Accordingly, the invention is not limited to the described embodiments or to use of specific elements, dimensions, materials, or configurations contained therein. All alternative modifications and variations of the present invention that fall within the spirit and broad scope of the appended claims are covered.

What is claimed is:

1. A valve actuating apparatus for operating a valve between an open and closed position comprising:

an actuator having an output member wherein the actuator provides reciprocating motion to the output member upon energization of the actuator;

a guide member connected to the output member of the actuator, the guide member having a detent therein;

a clutch assembly having a housing, an electromagnet assembly, an engagement member, and a housing opening, the engagement member disposed in the housing between the electromagnet assembly and the housing opening, wherein the housing opening is adapted to receive the guide member therein such that the clutch assembly and a portion of the guide member are slidably connected, the electromagnet assembly being selectively energized to force the engagement member against the guide member disposed in the housing opening;

a valve control arm adapted for engagement with the valve to operate the valve between an open and closed position, the valve control arm connected to the clutch assembly;

a spring connected to the valve control arm or the clutch assembly for normally biasing the clutch assembly and valve control arm to a first position along the guide member such that the valve is in a closed position;

a switch for selectively permitting energization of the actuator, said switch normally in a closed position to permit energization of the actuator and said switch disposed adjacent the valve control arm;

wherein upon energization of the actuator and electromagnet assembly, the actuator moves the guide member to position the detent of the guide member adjacent the engagement member of the clutch assembly and the electromagnet assembly forces the engagement member into engagement with the detent of the guide member to couple the guide member and clutch assembly together and wherein further reciprocal movement of the guide member rotates the valve control arm from the first position to a second position to rotate the valve to the open position where the valve control arm engages the switch to interrupt power to the actuator to maintain the valve in the open position, wherein upon interruption of power to the electromagnet assembly, the biasing force of the spring forces the engagement member of the clutch assembly out of engagement with the detent of the guide member and the spring forces the clutch assembly and valve control arm to slide along the guide member back to the first position to rotate the valve to the closed position.

2. The apparatus of claim 1 wherein the electromagnet is in the form of a solenoid.

3. The apparatus of claim 1 wherein the actuator comprises a gear motor to provide rotary output to an output shaft, with the output shaft connected to the guide member to provide reciprocal movement to the guide member.

4. The apparatus of claim 3 wherein the motor utilizes DC current.

5. The apparatus of claim 1 further comprising a stop member which is disposed adjacent the valve control arm, wherein the stop member is positioned to contact and retain the valve control arm when the valve control arm moves from the second position to the first position to maintain the valve in the closed position.

6. The apparatus of claim 3 further comprising an electrical brake such that when the valve control arm activates the switch to cut off power to the actuator, the brake stops further movement of the output shaft of the actuator to maintain the valve control arm in the second position.

7. The apparatus of claim 6 wherein the brake includes a normally open circuit between the switch and the motor such that upon engagement of the switch by the valve control arm to interrupt power to the motor, the normally open circuit is closed to create an electrical short across the motor to stop the rotation of the motor.

8. The apparatus of claim 1 wherein the detent of the guide member is formed as an aperture and the engagement member of the clutch assembly is formed as a ball, wherein the ball is forced into the aperture of the guide member to couple the clutch assembly and the guide member together upon energization of the actuator and the electromagnet assembly.

9. A valve actuating apparatus for operating a valve between an open and closed position comprising:

a motor to provide rotary output to an output shaft; a guide member connected to the output shaft of the motor, the guide member having an aperture therein;

a ball clutch assembly having a housing, an electromagnet assembly, a ball, and a housing opening, the ball disposed in the housing between the an electromagnet assembly and the housing opening, wherein the housing opening is adapted to receive the guide member therein such that the ball clutch assembly and a portion of the guide member are slidably connected, the electromagnet assembly being selectively energized to force the ball against the guide member disposed in the housing opening;

a valve control arm designed for engagement with the valve to operate the valve between an open and closed position, the valve control arm connected to the ball clutch assembly;

a spring connected to the valve control arm or the ball clutch assembly for normally biasing the ball clutch assembly to a first position along said guide member such that the valve control arm is in the closed position;

a switch for selectively permitting energization of the motor, said switch normally in a closed position to permit energization of the motor;

wherein upon energization of the motor and the electromagnet assembly, the motor output shaft rotates to position the aperture of the guide member adjacent the ball in the ball clutch assembly and the electromagnet assembly forces the ball into engagement with the aperture of the guide member to couple the guide member and ball clutch assembly together, wherein further rotation of the output shaft moves the guide member and ball clutch assembly to rotate the valve control arm to the open position where the valve control arm engages the switch to interrupt power to the motor to maintain the valve control arm in the open position, wherein upon interruption of power to the electromagnet assembly, the biasing force of the spring forces the ball out of engagement with the aperture in the guide member to disengage the ball clutch assembly from the guide member with the spring forcing the ball clutch assembly to slide back along the guide member to the first position and rotating the valve control arm to the closed position.

10. The apparatus of claim 9 wherein the switch is a mechanical switch such that the valve control arm contacts the switch to activate the switch to interrupt power to the motor.

11. The apparatus of claim 9 wherein the switch is a magnetic switch and the valve control arm includes a portion constructed from metal such that the movement of the valve control arm to the position adjacent the switch activates the switch and interrupts power to the motor.

12. The apparatus of claim 9 further comprising a brake such that when the valve control arm activates the switch to cut off power to the motor, the brake stops further rotation of the output shaft of the motor to maintain the valve control arm in the open position.

13. The apparatus of claim 9 wherein the motor utilizes DC current.

14. The apparatus of claim 9 wherein the electromagnet assembly is in the form of a solenoid.

15. The apparatus of claim 9 wherein the electromagnet assembly includes an electromagnet and magnet core movably disposed within the housing of the ball clutch assembly and a magnet plate disposed in a fixed position between the ball and magnet core; the electromagnet assembly further includes an engagement rod which is secured to the magnet core and has an end which engages the ball of the ball clutch assembly, wherein upon energization of the electromagnet, the magnet core is pulled toward the fixed magnet plate and the engagement rod forces the ball into engagement with the aperture in the guide member to couple the ball clutch assembly and guide member together.

16. A valve actuating apparatus for operating a valve between an open and closed position comprising:

an actuator having an output member wherein the actuator provides reciprocating motion to the output member upon energization of the actuator;

a guide member connected to the output member of the actuator, the guide member having a detent therein;

a clutch assembly having a housing, an electromagnet assembly, an engagement member, and a housing opening, the engagement member disposed in the housing between the electromagnet assembly and the housing opening, wherein the housing opening is adapted to receive the guide member therein such that the clutch assembly and a portion of the guide member are slidably connected, the electromagnet assembly being selectively energized to force the engagement member against the guide member disposed in the housing opening;

a valve control arm adapted for engagement with the valve to operate the valve between an open and closed position, the valve control arm connected to the clutch assembly;

a spring connected to the valve control arm or the clutch assembly for normally biasing the clutch assembly and valve control arm to a first position along the guide member such that the valve is in the open or closed position;

a switch for selectively permitting energization of the actuator, said switch normally in a closed position to permit energization of the actuator and said switch disposed adjacent the valve control arm;

wherein upon energization of the actuator and electromagnet assembly, the actuator moves the guide member to position the detent of the guide member adjacent the engagement member of the clutch assembly and the electromagnet assembly forces the engagement member into engagement with the detent of the guide member to couple the guide member and clutch assembly together and wherein further reciprocal movement of the guide member rotates the valve control arm from the first position to a second position to rotate the valve to the closed or open position where the valve control arm engages the switch to interrupt power to the actuator to maintain the valve in the closed or open position, wherein upon interruption of power to the electromagnet assembly, the biasing force of the spring forces the engagement member of the clutch assembly out of engagement with the detent of the guide member and the spring forces the clutch assembly and valve control arm to slide along the guide member back to the first position to rotate the valve to the open or closed position.

\* \* \* \* \*